July 20, 1948.  M. GODBE, JR  2,445,573
TRANSMISSION
Filed Feb. 17, 1945  3 Sheets-Sheet 1

Inventor
Murray Godbe, Jr.
By Stevens and Davis
Attorneys

Inventor
Murray Godbe, Jr.

By Stevens & Davis
Attorneys

July 20, 1948.  M. GODBE, JR  2,445,573
TRANSMISSION
Filed Feb. 17, 1945  3 Sheets-Sheet 3

Inventor
Murray Godbe, Jr.

By Stevens and Davis
Attorneys

Patented July 20, 1948

2,445,573

UNITED STATES PATENT OFFICE 2,445,573

TRANSMISSION

Murray Godbe, Jr., Salt Lake City, Utah

Application February 17, 1945, Serial No. 578,414

3 Claims. (Cl. 74—293)

This invention relates to an apparatus for transmission of power from a prime mover to a mechanism to be operated thereby. It is illustrated as applied to, and is especially useful for, the purpose of transmitting power from the engine of an automobile to the driving wheels thereof.

In accordance with my invention I have designed the herein described embodiment in which there is provided a transmission device having a planetary or epicyclic gearing. The gearing in the embodiment shown is a unit comprising three interconnected and cooperating elements to one of which power may be applied and from the other two of which the power may be exerted to turn rotatable elements at varying desired speeds. In combination with such a unit I provide a variable resistance means for receiving power from one of said output elements constructed in such a way that it may vary substantially infinitely the speed of such output element. Thus the power supplied to and the speed of the other or second output element may be varied through wide limits and inasmuch as this second output element is arranged to supply power to the device to be operated, the ratio between torque supplied and output torque may be varied also between wide limits. As disclosed, and preferably, the resistance device to which the first output element is connected is hydraulic in nature.

Prior to my invention transmission devices have been devised in which planetary gearing systems have been associated with hydraulic clutches for the purpose of varying the ratio of the speed of rotation of an input shaft to the speed of rotation of the output shaft and for the purpose of providing reverse as well as forward movement of the output shaft. Also prior to my invention, means have been provided for varying the ratio between the input shaft and the output shaft by mechanical means. Devices have been designed comprising various combinations of hydraulic means and planetary means for providing a stepped variation of ratio of speed of input and output means. So far as I am aware, however, no one has developed a transmission system in which the hydraulic means forms a resistance or abutment against which the planetary drive operates so as to vary in substantially infinite ratio the speed of the output shaft relative to the speed of the input shaft and thus vary the torque given out relative to the torque input. I have also devised in combination with such a transmission in which the hydraulic means forms an abutment against which a planetary drive operates, a novel arrangement by which the direction of the output drive may be reversed.

One of the objects of my invention is the provision of an infinitely variable transmission means.

A further object of my invention is the provision of a simple transmission system in which a hydraulic abutment is utilized to provide a substantially infinitely variable ratio between the prime mover and the device to be operated.

A further object of my invention is the provision in combination with a hydraulic abutment and a substantially infinitely variable planetary transmission system, of means for reversing the direction of rotation of the output shaft thereof.

A feature of my invention is the provision in combination with a planetary gear transmission system having three separate elements connected respectively to a power drive, to a power output and to an abutment, of means for optionally shifting the connections thereto so that connections between two of the elements of the planetary gear system and two of the members connected thereto may be reversed.

A specific feature of the invention as illustrated is the provision of a driven shaft which may optionally be connected to either of two elements of the planetary gear system, a hydraulic abutment which may optionally be connected to either of said two elements of the planetary gear system, together with means for insuring that when said driven shaft is connected to either of said two elements the hydraulic abutment means is connected to the other of said two elements.

Further objects and features of the invention will be apparent from a consideration of the following specification and claims, together with the attached drawings, in which:

Figure 1:
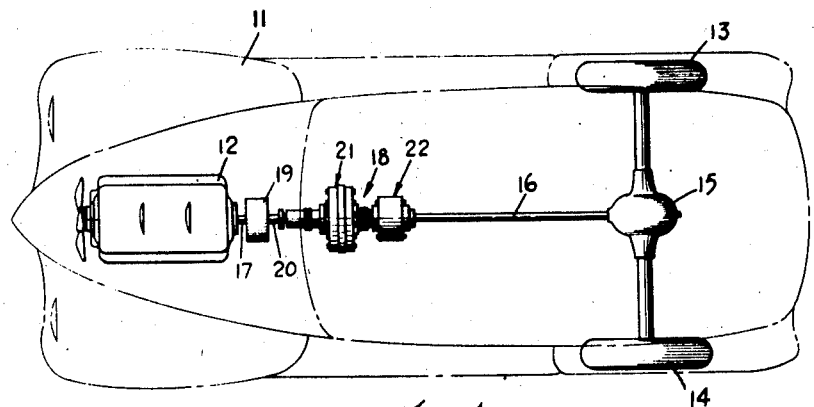
Figure 1 is a plan view showing my invention applied for illustration to an automobile, portions of the automobile having been removed and the outline thereof shown in dotted lines.

Referring to the drawings, it may be seen that I have illustrated my invention as applied to an automobile 11 having an engine 12 which serves as a prime mover for the automobile, and which is arranged to drive an engine shaft 17. The automobile also has driving wheels 13 and 14 which are arranged to be driven through a differential gear 15 from a driven shaft 16. As will be seen later the power shaft 17 is arranged to drive the driven shaft 16 through a transmission 18. The transmission is a part of the connecting means between the power shaft and the drive shaft and is illustrated in outline in Figures 1 and 2. As shown therein the power shaft 17 is connected and drives the driven shaft 16 through a clutch 19, a power shaft 20 and the transmission 18. The transmission 18 generally includes two parts, one of which is a planetary gear generally designated 21 and the other of which is a hydraulic pump which is generally designated 22 and which serves as an abutment for one of the elements of the planetary gear.

Figure 3:
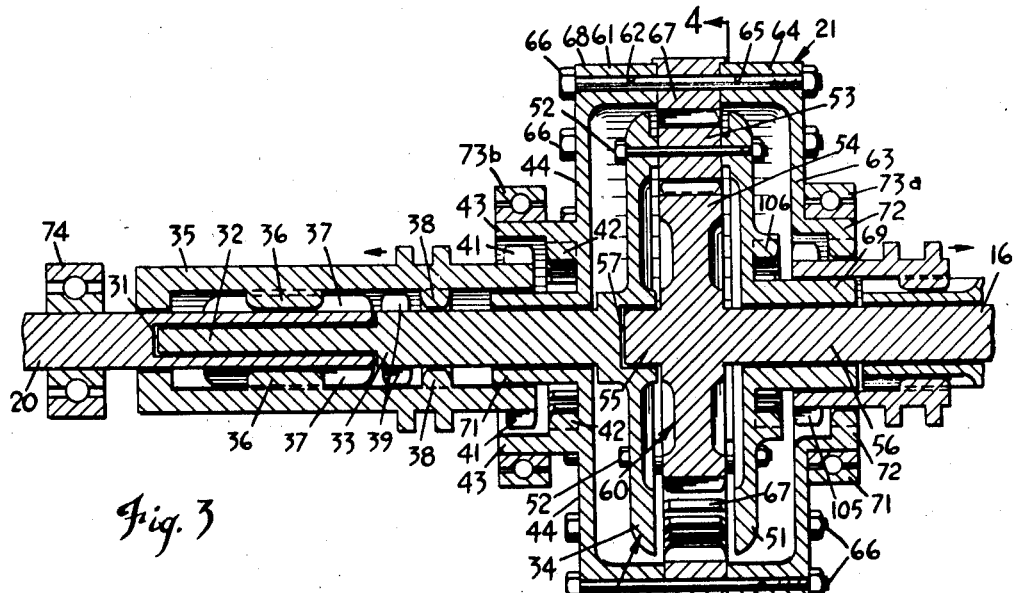
Figure 3 is a view in section showing the planetary gear system and the associated sleeves and gearing by which the power shaft, driven shaft and the hydraulic abutment device are connected thereto.
Figure 4:
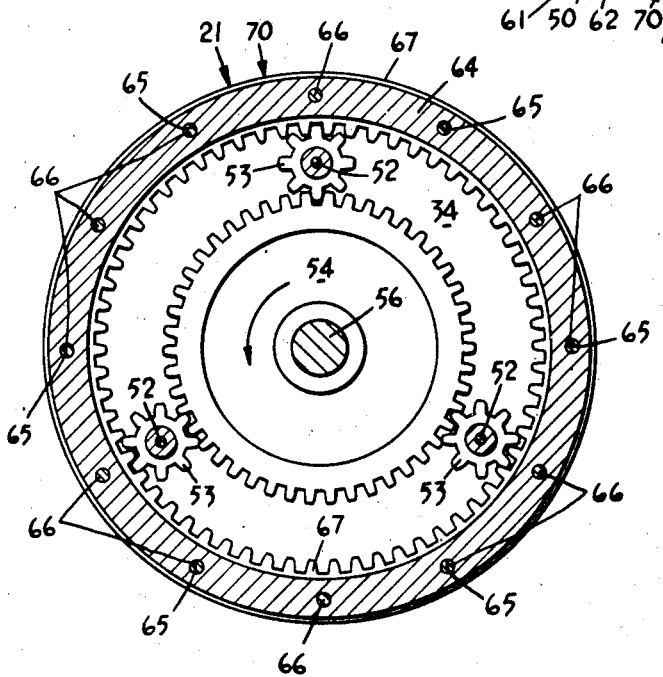
Figure 4 is a sectional view taken at right angles to the view of Figure 3 substantially on the line 4—4.

The planetary gear is driven by the power shaft through the following described means which are shown most clearly in Figures 3 and 4. Referring thereto it may be seen that the power shaft 20 is formed with a concentric bore 31 which receives the reduced end 32 of a concentric stub shaft 33 formed integrally with a rotatable circular plate or spider 34 forming a portion of the planetary gear 21.

Surrounding the power shaft 20 and the stub shaft 33 is a shifter sleeve 35 provided with splines 36 cooperating with splines 37 formed on the power shaft 20. The shifter sleeve 35 is provided with teeth 38 arranged to engage teeth or splines 39 formed on the stub shaft 33. The shifter sleeve 35 is also provided with teeth or splines 41 arranged to engage teeth 42 formed (for purposes later to be described) on an annular extension 43 of planetary gear casing plate 44. The shifter sleeve 35 may be moved by a shifter fork 40 (see Fig. 2) in either direction from the neutral position, which is the position shown in Figure 3. It may be thus seen that if the sleeve 35 is moved to the left (as shown in Figure 3) the teeth 38 will engage with the teeth 39 of the stub shaft 33 so that the stub shaft 33 is connected with, in effect forms an extension to, and is driven by the power shaft 20.

The planetary gear 21 includes a spider or rotating cage generally designated 50, a sun gear unit 60, and a ring gear unit 70. The spider 50 consists of the plate 34, a rotatable plate 51 which is complementary to the plate 34, a plurality of bolts 52 securing the plates 34 and 51 to each other and arranged to rotate with the plates 34 and 51, and a planet wheel or gear 53 mounted on each of said bolts 52. The bolts serve as bearings for such planet gears 53 and form axes about which the planet gears 53 may rotate.

The second rotatable member of the planetary gear system is the sun gear unit 60. Positioned concentrically with said rotatable plates 34 and 51 and with said power shaft 20 and stub shaft 33 is a sun wheel or gear 54 having oppositely extending concentric shafts 55 and 56 formed integrally therewith or secured thereto. The shaft 55 is journaled in a concentric bore 57 formed in the stub shaft 33. The shaft 56 may be formed integrally with the drive shaft 16 (see Figure 3) or secured to said driven shaft 16 so as to form an extension thereof.

The third member of the planetary gear system is the ring gear unit 70 and will now be described. As may be seen in Figures 3 and 4 the planetary gear casing plate 44 is formed with an annular extension 61 having a plurality of bores 62. A complementary plate 63 is provided with an annular extension 64 and with complementary bores 65 so that the plates 44 and 63 may be secured to each other by bolts 66 passing through said bores 62 and 65 and may together with said bolts 66 support a ring gear 67 secured between the extensions 61 and 64. The unit 70 formed by the plates 44 and 63 and the ring gear 67 is supported for rotation on the stub shaft 33 within the bearings 73ª and 73ᵇ. The plates 44 and 63 are connected together and turn about the stub shaft 33 with the annular sleeve 71 functioning as a bearing. An extension 69 formed on the plate 51 is journaled for rotation on the shaft 56 formed with the sun gear 54.

It is to be understood that the planetary gear, including the sun gear unit 60, the spider unit 50, and the gear unit 70 are all contained in and enclosed by the casing 68.

Thus it may be seen that the three units (i. e., (1) the sun gear unit 60, (2) the spider 50 and planet gears 53, and (3) the casing 68 and ring gear unit 67) may each rotate about the common axis independently of each other except for the connections between the teeth of the gears 54, 53 and 67. As previously stated the plate 44 has an extending sleeve 43 carrying the teeth 42. The sleeve 43 is journaled in bearing 73ᵇ. The plate 63 is provided with a similar sleeve 72 journaled in bearing 73ª. Bearing 74 is provded for the power shaft 20.

Figure 5:
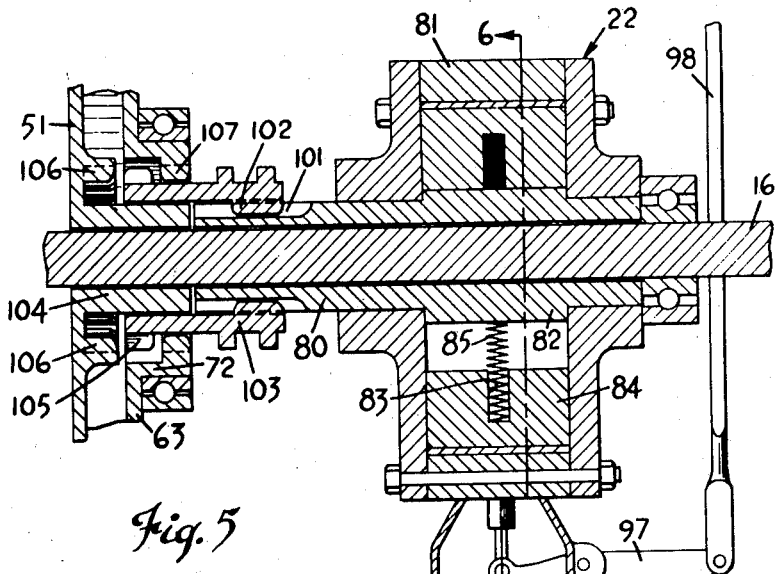
Figure 5 is a sectional view of the hydraulic device taken substantially in the same plane as the sectional view of Figure 3; and, Figure 6 is a sectional view of the hydraulic device taken substantially at right angles to the view of Figure 5, and substantially on the line 6—6.
Figure 6:
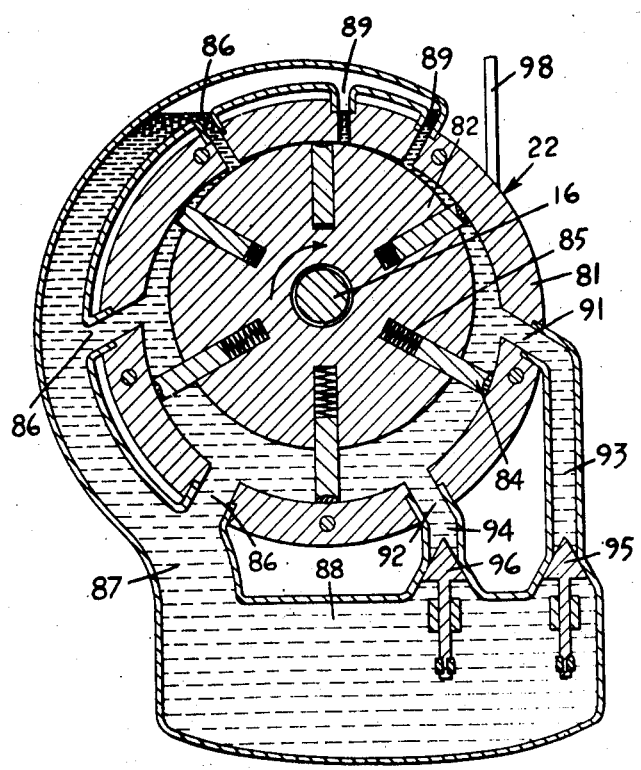

I will now describe the hydraulic resistance unit. Referring especially to Figures 5 and 6, it may be seen that there is included in the hydraulic pump 22 a casing 81 and eccentric rotor 82 mounted within the casing 81 and secured to the driven shaft 16 for rotation therewith. The rotor 82 is provided with a plurality of slots such as 83 in each of which there is positioned a slidable vane 84 outwardly urged, as by a spring 85, into contact with the casing or housing 81 so as to maintain an oil seal between the rotor and the casing. The casing 81 is provided with a plurality of inlet ports such as 86 allowing the flow of oil from the manifold or conduit 87 and from the sump or reservoir 88 into the interior of the casing 81. Outlet ports 91 and 92 lead to outlet conduits 93 and 94, respectively, the flow of oil or other liquid outward through said conduits being controlled by valves 95 and 96, respectively. As shown, the valves 95 and 96 are in the nature of poppet valves being conical in shape and having seats which cooperate with the angle of the valve surface to form a tight seal or a restricted passage. However, any other suitable type of valve may be used, provided it is arranged to restrict variably the flow of liquid and is sufficiently rugged to withstand the pressures exerted. For instance, a gate valve having a tapered gate or a tapered port or both could be advantageously used. The valves 95 and 96 may be moved from the fully closed position as shown in Figure 6 to a fully open position or to any intermediate position so as to meter the amount of oil flowing outward therethrough. This movement may be accomplished by means of valve levers 97 and control rods 98. The rotor 82 is formed integrally with a sleeve 80 which is journaled on the driven shaft 16. Thus, it may be seen that rotation of the sleeve 80 within the fixed casing 81 causes rotation of the rotor 82 and assuming the rotation is in the direction of the arrow in Figure 6 (i. e., counterclockwise), liquid will be drawn in through the ports 86 and forced out through the ports 91 and 92. Depending upon the position of the valves 95 and 96 the movement of this liquid will encounter more or less resistance, it being understood that with the valves 95 and 96 fully open the liquid may move with substantially no resistance and the rotor 82 and the sleeve 80 also rotate with little or no resistance. The casing 81 is also formed with bleeder ports 89 for the relief to conduit 87 and reservoir 88 of liquid which may be trapped beyond the outlet port 91.

Figure 2:
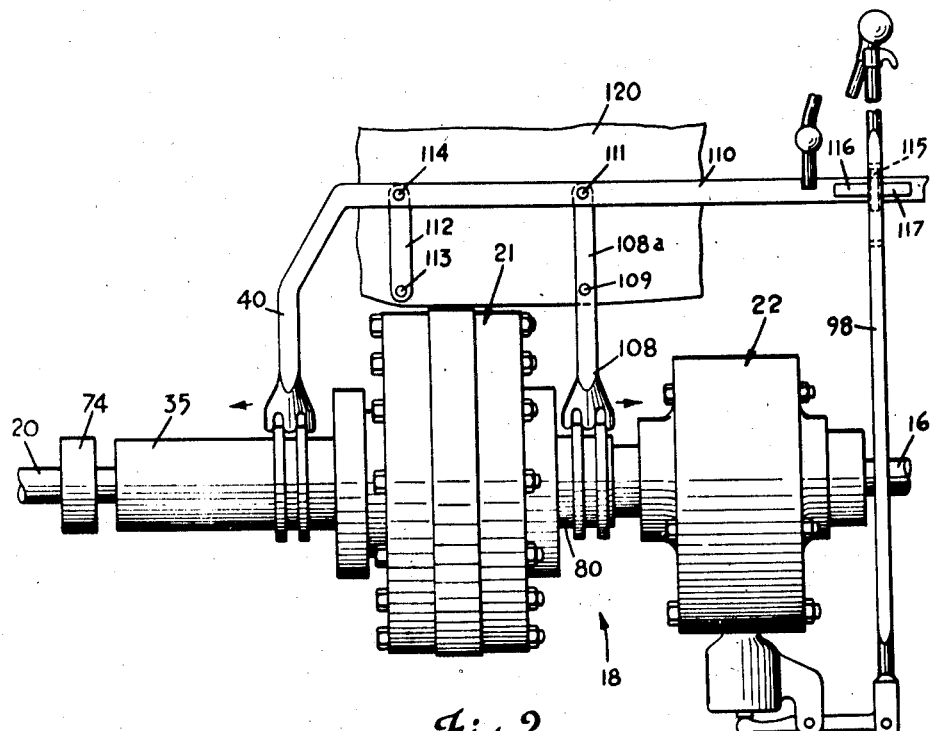
Figure 2 is an enlarged view in elevation having parts broken away and showing the planetary gear and the hydraulic abutment in outline and illustrating the shifter control, the valve control, and the interlock between the shifter control and the valve control.

The sleeve 80 is formed with splines 101 co-operating with splines 102 formed on a short shifter sleeve 103 arranged to slide on the sleeve 80 and on a sleeve 104 formed as an annular concentric extension of the plate 51. The sleeve 103 is provided with a gear 105 having a series of teeth arranged to mesh with either teeth 106 formed on the plate 51 or with teeth 107 formed on the sleeve 72 extending from the plate 63. The shifter fork 108 is so connected with the shifter fork 40 (as is shown in Figure 2) that movement of the shifter sleeve 35 to the left, as shown in Figures 2 and 3, to engage teeth 38 with teeth 39 of the stub shaft 33 moves sleeve 103 to the right to engage teeth 105 with teeth 107 and movement of the sleeve 35 to the right as shown in Figure 3 to engage teeth 41 with teeth 42 moves sleeve 103 to the left to engage teeth 105 with teeth 106. Thus, when the power shaft 20 is connected by means of the sleeve 35 with the stub shaft 33 and the spider unit 50 and the planet gears 53, the sleeve 80 of the rotor 82 is secured to the plate 63 and the ring gear 67. When the power shaft 20 is connected by the shifter sleeve 35 with the plate 44 and the ring gear 67, the sleeve 80 is connected by the shifter sleeve 103 with the spider unit 50 and the planet gears 53. At all times, the third unit of the planetary gear system, that is, the sun gear unit 60, is connected to and drives the driven shaft 16.

Referring now again to Figure 2, it may be seen that the shifter fork lever 108 is pivotally supported as at 109 on an element 120 forming a relatively stationary portion of the automobile. The shifter fork 40 is formed integrally with the operating rod 110. The rod 110 is supported by the shifter fork lever 108ᵃ pivotally connected to the rod 110 at 111 and by a link 112 pivotally supported at 113 on the element 120ᶜ and pivotally connected to the rod 110 at 114. This arrangement insures that movement of the fork 108 to the right, as shown in Figure 2, requires the movement of the shifter fork 40 to the left and movement of the shifter fork 108 to the left insures movement of the shifter fork 40 to the right.

When the valve operating rod 98 is moved downward to the position shown in Figures 5 and 6, so that the valves 95 and 96 are closed, it interposes an abutment 115 in the path of motion of projections 116 and 117 formed on the link 110 so that the forks 108 and 40 may not be operated. Thus the forks 40 and 108 may not shift the sleeves 35 and 80 except when the valves are open and, as will presently appear, except when no power is being transmitted to the driven shaft 16.

*Operation*

With the parts in the position shown in Figures 2, 3 and 5, the power shaft 20 and the shifter sleeve 35 are disconnected both from the stub shaft 33 and the spider unit 50 and from the casing 68 and the ring gear unit 70. Let us assume that the power shaft 20 is rotating in a counterclockwise direction as viewed from the right in Figures 2 and 3, that is, in the same direction as shown by the arrow in Figure 4. However, no motion is imparted by the power shaft to any portion of the planetary gear system or to any part of the hydraulic pump or the driven shaft 16. In order to effect forward motion it is necessary first to open the valves 95 and 96 by operation of the valve-operating rod 98. This allows operation of the shifter forks 40 and 108 and if it is desired to operate the car in a forward direction, the shifter forks are moved so that (as viewed in Fig. 3) the sleeve 35 moves to the left and the sleeve 103 moves to the right. This creates a connection between the power shaft 20, the stub shaft 33 and the spider unit 50. It also creates a connection between the ring gear unit 70 and the sleeve 80 of the hydraulic unit 22. Inasmuch as the valves 95 and 96 are still open, substantially no resistance to the rotation of the sleeve 80 is encountered and the rotation of the spider unit 50 causes the planet gears 53 to rotate on the sun gear 54 in a counterclockwise direction and to rotate the ring gear 67 also in a counterclockwise direction at approximately twice the speed of the shaft 20, the driven shaft 16 and the sun gear unit 60 remaining stationary. The rotor 82 will revolve counterclockwise (Fig. 6) as stated at a speed faster than the speed of the shaft 20. Now if the driver desires to move the car, the valve rod 98 is operated to close the valves 95 and 96 slightly, thus restricting the passages 91 and 92 and imposing resistance to movement of the rotor 82 and the sleeve 80. This imposes resistance to movement of the ring gear 67 and thereupon torque is transmitted by the planet gears 53 to the sun gear 54. The sun gear 54 and driven shaft 16 are caused to rotate counterclockwise at a comparatively low speed. By reason of the relatively high ratio between the speed of rotation of the power shaft 20 and the driven shaft 16, the torque conveyed to the shaft 16 is relatively high although the speed is relatively low. As the car gains momentum the valves 95 and 96 are gradually brought nearer and nearer to a closed position. When they are finally completely closed, passage of liquid out of the conduits 93 and 94 is blocked, rotation of the rotor 82 and the sleeve 80 is prevented and the ring gear 67 is stopped. Thereupon the planet gears 53 rotate about their axes travelling on the ring gear 67 and cause a relatively high rate of rotation of the sun gear 54 and the driven shaft 16. At such time the speed for the driven shaft 16 is something more than twice the speed of the power shaft 20. Thus, it may be seen that I have devised an arrangement of parts which provides substantially infinite variation of ratios of speed between a power shaft and a drive shaft, and consequently may be able to vary the torque conveyed to the drive shaft from the power shaft through my improved transmission in substantially any desired ratio.

If it is desired to reverse the direction of travel of the automobile, the valves 95 and 96 are first opened so that the rotor 82 and the sleeve 80 and the ring gear 67 may revolve freely. The car is brought to a stop by means of conventional wheel brakes, and the sleeves 35 and 103 are moved to the neutral position shown in Figures 2 and 3. As soon as the rotation of the ring gear 67 slows sufficiently, the shifter fork operating rod 110 is moved to the right from the position as shown in Figure 2, thus moving sleeve 35 to the right as shown in Figure 3 and moving the sleeve 103 to the left as shown therein. Thereupon the power shaft 20 is connected to the ring gear unit 70 and drives it clockwise as viewed in Figure 4. The valves 95 and 96 are closed to the extent desired. Inasmuch as the sleeve 80 is now connected with the spider unit 50 the rotation of spider 50 is resisted or prevented. Rotation of the ring gear 67 causes the planet gears to rotate on their axes 52, thus causing the sun gear 54 and the driven shaft 16 to rotate in a clockwise direction. This rotation of the driven shaft 16 acts through the differential 15 to drive the automobile backwards.

While I have illustrated my invention as applied to the transmission of an automobile, it applies also to other mechanisms for use with any kind of motor driven machine including all kinds of electric motor driven and every other power driven apparatus.

It is to be understood that the above-described embodiment of my invention is for the purpose of illustration only and that various modifications may be made in the details of construction, the general arrangement, the association of the several cooperating parts and the application of my invention without departing from the spirit thereof or the principles herein set forth.

I claim:

1. In a planetary transmission including as elements a ring gear, a sun gear and means supporting planet gears therebetween, a driven shaft permanently connected to one of said elements, a drive shaft, a resistance pump supported on said driven shaft, means for selectively establishing a driving connection between said drive shaft and either of said elements not connected to the driven shaft, means for selectively establishing a driving connection between the remaining element not so connected and said pump and means for varying the resistance imposed by said pump.

2. In a planetary transmission including as elements a ring gear, a sun gear and means supporting planet gears therebetween, a driven shaft permanently connected to one of said elements, a drive shaft, a resistance pump supported on said driven shaft, a clutch sleeve connected to said pump in driving relation thereto and coaxially surrounding said driven shaft, means for moving said clutch sleeve into clutching engagement with either of the elements of the transmission which are not connected to said driven shaft, and means interlocked with said clutch moving means for establishing a driving connection between said drive shaft and the remaining element not attached to said driven shaft, and means for varying the resistance imposed by said pump.

3. In a planetary transmission including as elements a ring gear, a sun gear and means supporting planet gears therebetween, a driven shaft permanently connected to one of said elements, a drive shaft, a resistance pump supported on said driven shaft, means for selectively establishing a driving connection between said drive shaft and either of the elements not connected to the driven shaft, means for selectively establishing a driving connection between the remaining element not so connected and said pump, means for varying the resistance imposed by said pump, said resistance varying means and both of said driving connection establishing means including interlocking elements for preventing actuation of the driving connection establishing means in a connection establishing direction until the resistance varying means has been moved to a resistance reducing position.

MURRAY GODBE, Jr.

REFERENCES CITED

The following references are of record in the file of this patent:

UNITED STATES PATENTS

| Number | Name | Date |
|---|---|---|
| 1,689,537 | Sorensen | Oct. 30, 1928 |
| 2,191,907 | Filippis | Feb. 27, 1940 |

FOREIGN PATENTS

| Number | Country | Date |
|---|---|---|
| 84,716 | Switzerland | Aug. 2, 1920 |
| 364,767 | Great Britain | Jan. 14, 1932 |